United States Patent
Subat et al.

(10) Patent No.: US 9,802,519 B2
(45) Date of Patent: Oct. 31, 2017

(54) CONNECTORS FOR SPEAKERS DISPOSED IN HEADRESTS

(71) Applicant: Bose Corporation, Framingham, MA (US)

(72) Inventors: Bradford Kyle Subat, Northborough, MA (US); Charles E. Dunn, Jr., Boylston, MA (US); Charles Oswald, Salem, NY (US); Kurt Mathew Heiden, Bolton, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 15/071,784

(22) Filed: Mar. 16, 2016

(65) Prior Publication Data

US 2017/0267137 A1 Sep. 21, 2017

(51) Int. Cl.
*B60N 2/48* (2006.01)
*B60N 2/64* (2006.01)
*H04R 1/02* (2006.01)

(52) U.S. Cl.
CPC .......... *B60N 2/4876* (2013.01); *B60N 2/4808* (2013.01); *B60N 2/64* (2013.01); *H04R 1/025* (2013.01)

(58) Field of Classification Search
CPC ...... B60N 2/4876; B60N 2/4808; B60N 2/64; H04R 1/025
USPC ............................................ 297/217.4, 217.5
See application file for complete search history.

(56) References Cited

U.S. PATENT DOCUMENTS

| 6,991,289 B2* | 1/2006 | House | B60N 2/4876 |
| | | | 297/217.4 |
| 7,114,780 B1* | 10/2006 | Lee | B60N 2/4802 |
| | | | 297/217.4 |
| 8,201,203 B2* | 6/2012 | Vitito | B60N 2/4876 |
| | | | 297/217.4 |
| 8,449,031 B2* | 5/2013 | Chang | B60N 2/48 |
| | | | 297/217.4 |
| 2010/0148550 A1* | 6/2010 | Kidd | B60N 2/4876 |
| | | | 297/217.4 |

* cited by examiner

*Primary Examiner* — Anthony D Barfield
(74) *Attorney, Agent, or Firm* — Fish & Richardson P.C.

(57) ABSTRACT

The technology can be embodied in a headrest that includes an enclosure that includes one or more acoustic transducers. The headrest includes a bar for mounting on a backrest of the seat, such that the mounted headrest is movable with respect to the backrest to different positions over an adjustable range. The bar includes one or more wires each of which is coupled to an electrical contact at one end, and an acoustic transducer at an opposite end, the one or more wires disposed within a hollow interior portion of the bar. The bar also includes an opening for permitting an electrical connection to be established between an electrical connector coupled to an external source, and the electrical contact coupled to the one or more wires. The connection is maintained over the adjustable range of the headrest by a mechanical bias on either the electrical connector or the electrical contact.

24 Claims, 7 Drawing Sheets

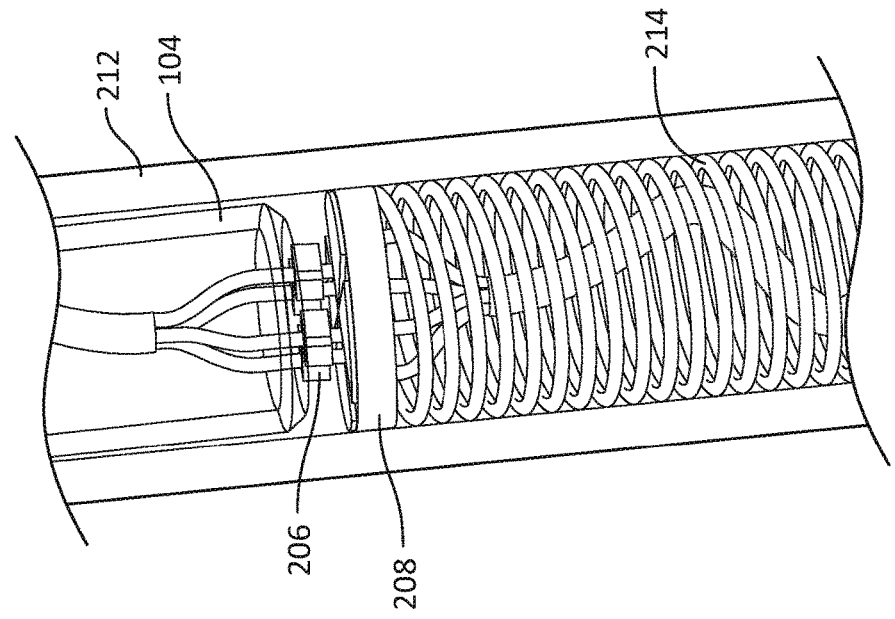
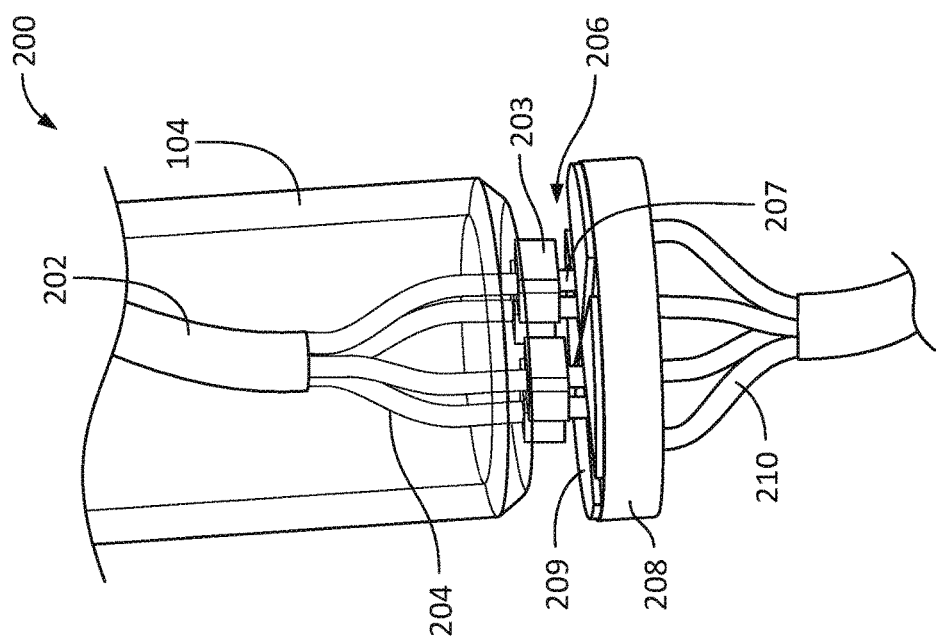
FIG. 2A
FIG. 2B

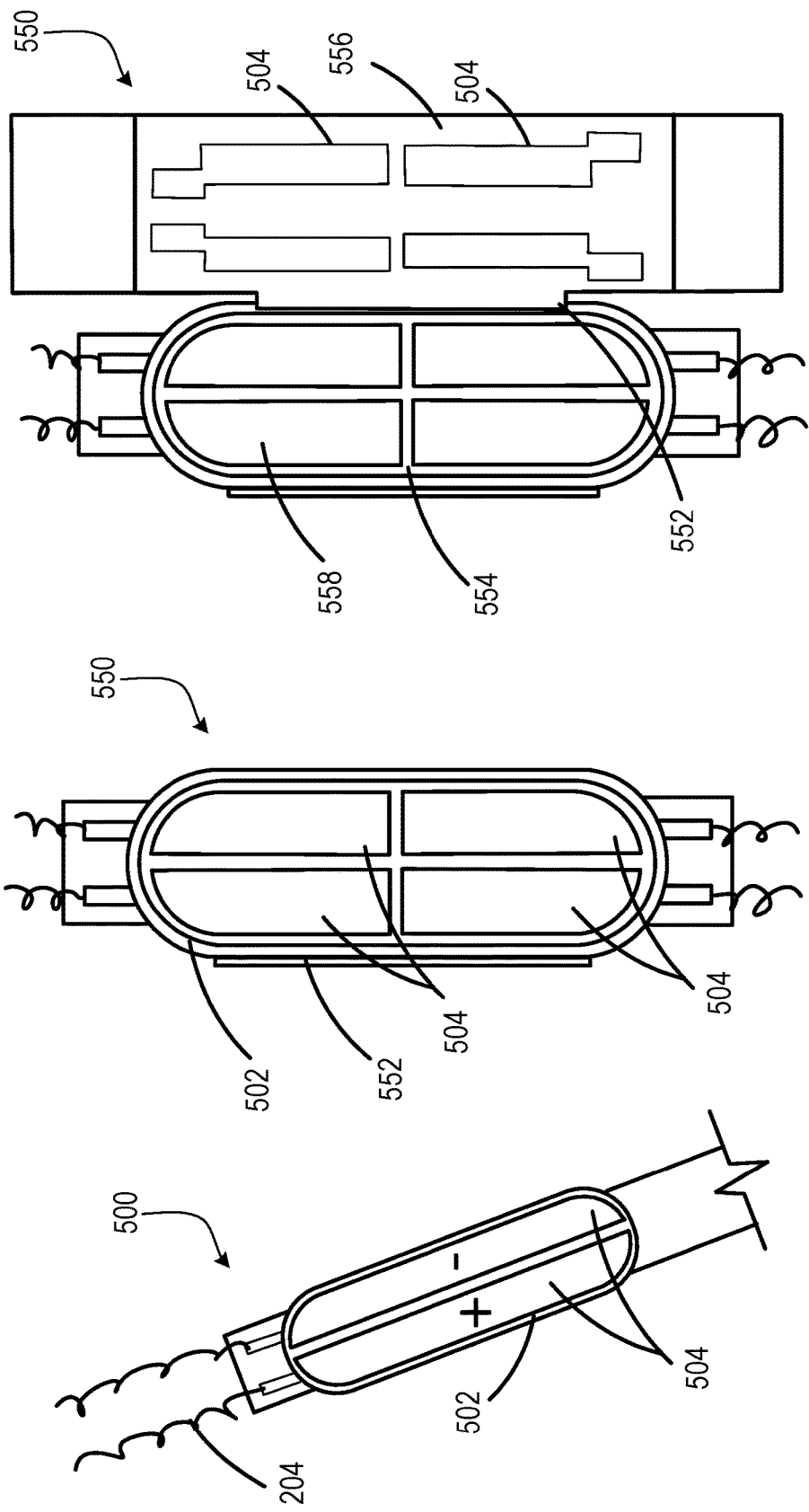

CONNECTORS FOR SPEAKERS DISPOSED IN HEADRESTS

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a headrest for a vehicle seat. The headrest includes an enclosure for supporting the head of an occupant of the vehicle seat. The enclosure also includes one or more acoustic transducers. The headrest further includes a bar for mounting the headrest on a backrest of the seat, such that the mounted headrest is movable with respect to the backrest to different positions over an adjustable range. The bar includes one or more wires each of which is coupled to an electrical contact at one end and one of the acoustic transducers at an opposite end, the one or more wires disposed within a hollow interior portion of the bar. The bar also includes an opening for permitting an electrical connection to be established between i) an electrical connector coupled to an external source and ii) the electrical contact coupled to the one or more wires. The connection is maintained over the adjustable range of the headrest by a mechanical bias on either the electrical connector or the electrical contact.

In another aspect, this document features a seat that includes a headrest, a backrest, an electrical connector, and an electrical contact. The headrest includes an enclosure for receiving one or more acoustic transducers. The electrical connector is disposed within a portion of the seat, and is coupled to an external source associated with the one or more acoustic transducers. The electrical contact is coupled to one or more wires connected to the one or more acoustic transducers. The backrest includes a receptacle for receiving a portion of the headrest, such that the headrest is movable with respect to the backrest to different positions over an adjustable range. The receptacle includes a sleeve with an opening for permitting a connection to be established between the electrical connector and the electrical contact. The seat further includes a bar configured to be inserted into the receptacle for mounting the headrest on the backrest. The bar includes a channel for receiving the one or more wires connected to the acoustic transducers, and a slot on a sidewall of the bar for permitting the connection to be established between the electrical connector and the electrical contact. The connection is maintained over the adjustable range of the headrest by a mechanical bias on either the electrical connector or the electrical contact.

In another aspect, this document features a seat that includes a headrest and a backrest. The headrest includes one or more acoustic transducers. The backrest includes a receptacle for receiving a portion of the headrest, such that the headrest is movable with respect to the backrest to different positions over an adjustable range. The headrest further includes an enclosure for receiving the one or more acoustic transducers, and a bar configured to be inserted into the receptacle for mounting the headrest on the backrest. The bar includes a hollow interior portion forming a channel for receiving one or more wires connected to the acoustic transducers, and a spring-loaded structure disposed within the hollow interior portion, the spring-loaded structure causing an electrical connector to maintain electrical contact with the one or more wires over the adjustable range of the headrest.

Implementations of the above aspects can include one or more of the following features.

The opening can be at one end of the bar, or disposed on a sidewall of the bar. The opening can be configured to receive the electrical contact in a locking configuration. The electrical contact can include a non-conducting portion that provides an electrically insulated barrier between the electrical contact and the bar. The opening is configured such that at least a portion of the electrical contact touches the connector through the opening over the adjustable range of the headrest. The electrical connector can include a leaf-spring that causes the connector to maintain physical touch with the electrical contact over the adjustable range of the headrest. The external source can include a power source configured to provide operating power to the acoustic transducers. The external source can include a source of an audio signal. The electrical connector can include a spring-loaded structure disposed within the hollow interior portion, the spring-loaded structure causing the electrical connector to maintain physical touch with the electrical contact over the adjustable range of the headrest.

The slot can be configured to receive the electrical contact in a locking configuration. The electrical contact can include a non-conducting portion that provides an electrically insulated barrier between the electrical contact and the bar. The slot can be configured such that at least a portion of the electrical contact touches the connector through the slot over the adjustable range of the headrest. The electrical connector can be disposed in the receptacle, or in the bar. The electrical connector can include a leaf-spring that causes the connector to maintain physical touch with the electrical contact over the adjustable range of the headrest. An upper portion of the bar can be coupled to the enclosure, and the spring loaded structure can be disposed in an opposite, lower portion of the bar.

Various implementations described herein may provide one or more of the following advantages. By providing a connector that pushes against a moving contact due to a mechanical bias, electrical connection may be maintained over a range of motion of an adjustable headrest. In some cases, this may obviate the need for inserting extendible wires such as pigtail harness wires through small cross sections of headrest bars. In addition, by providing a moving contact point or surface (which may be constructed using a self-wiping material such as gold) between two conductors, surface corrosion between the two conductors may be reduced or broken up, thereby potentially increasing the effective life of the contact point or surface.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIGS. 2A and 2B show portions of a mechanically biased electrical connection mechanism disposed in a bar or support rod of a headset.

FIGS. 5A-5C show examples of electrical contacts that may be disposed in a headrest bar for providing electrical connections to speakers disposed in the headrest.

DETAILED DESCRIPTION

Figure 1A:
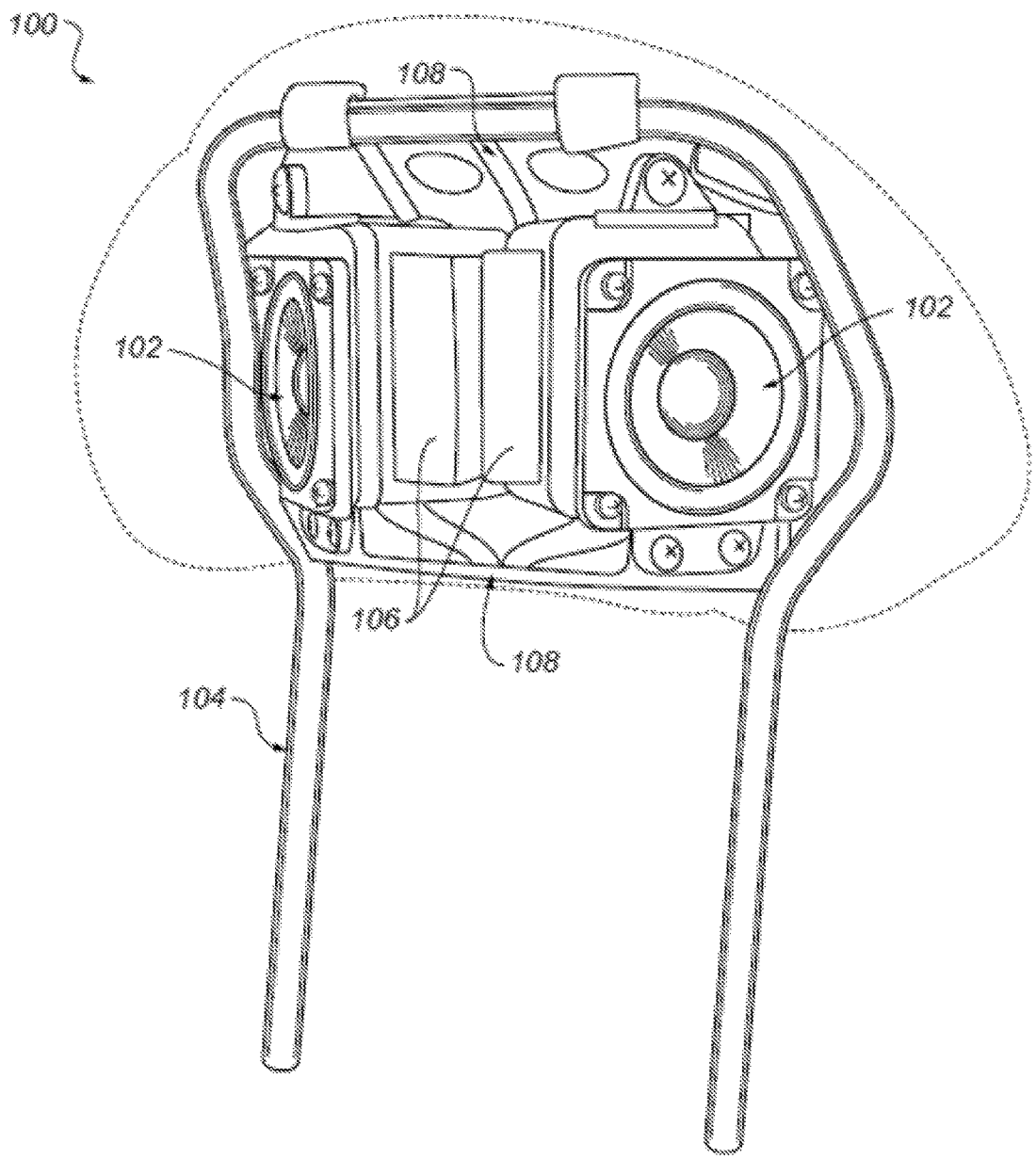
FIG. 1A is a perspective view of a headrest that includes speakers.

Vehicle seats can be fitted with acoustic transducers or speakers for delivering a near-field acoustic experience. For example, speakers can be fitted into seats such that the speakers are proximate to the ears of an occupant of the seat, to provide an immersive, and potentially personalized acoustic experience. The speakers can be disposed, for example, in a headrest of the seat, or in a portion of the seat near the occupant's neck or shoulders. When multiple speakers are used, the speakers may also be distributed in various parts of the seat, for example, to provide an immersive acoustic effect. This document primarily uses examples of vehicle seat headrests to illustrate the technology. However, the technology may be applicable to other types of acoustically enabled seats or furniture that may have speakers installed in the manner described herein. For example, the technology can be used in massage chairs, sofas, recliners, tables, or beds fitted with speakers.

FIG. 1 illustrates an example of a headrest 100 that incorporates speakers 102. Referring to FIG. 1, the speakers 102 are attached to a U-shaped support rod 104 and are positioned such that the speakers 102 are directly behind the user's head (i.e., as opposed to the being located on the left and right sides of the U-shaped support rod or bar 104, which in some cases, may be replaced by a combination of two separate bars) and to fire outwardly, in diverging directions on either side of the headrest 100.

In some cases, a small plastic enclosure 106 is attached to each speaker 102 for forming an acoustic enclosure. In some implementations, each of those sub-assemblies are disposed in a housing (e.g., a sheet metal cage 108) which is secured to the U-shaped support rod 104. FIG. 1 shows a partial assembly with a front portion of the sheet metal cage 108 removed to view the speakers 102 and enclosures 106. A molded piece of foam cushioning may be placed around that assembly, which is subsequently covered with a cover material (e.g., fabric or leather).

Figure 1B:
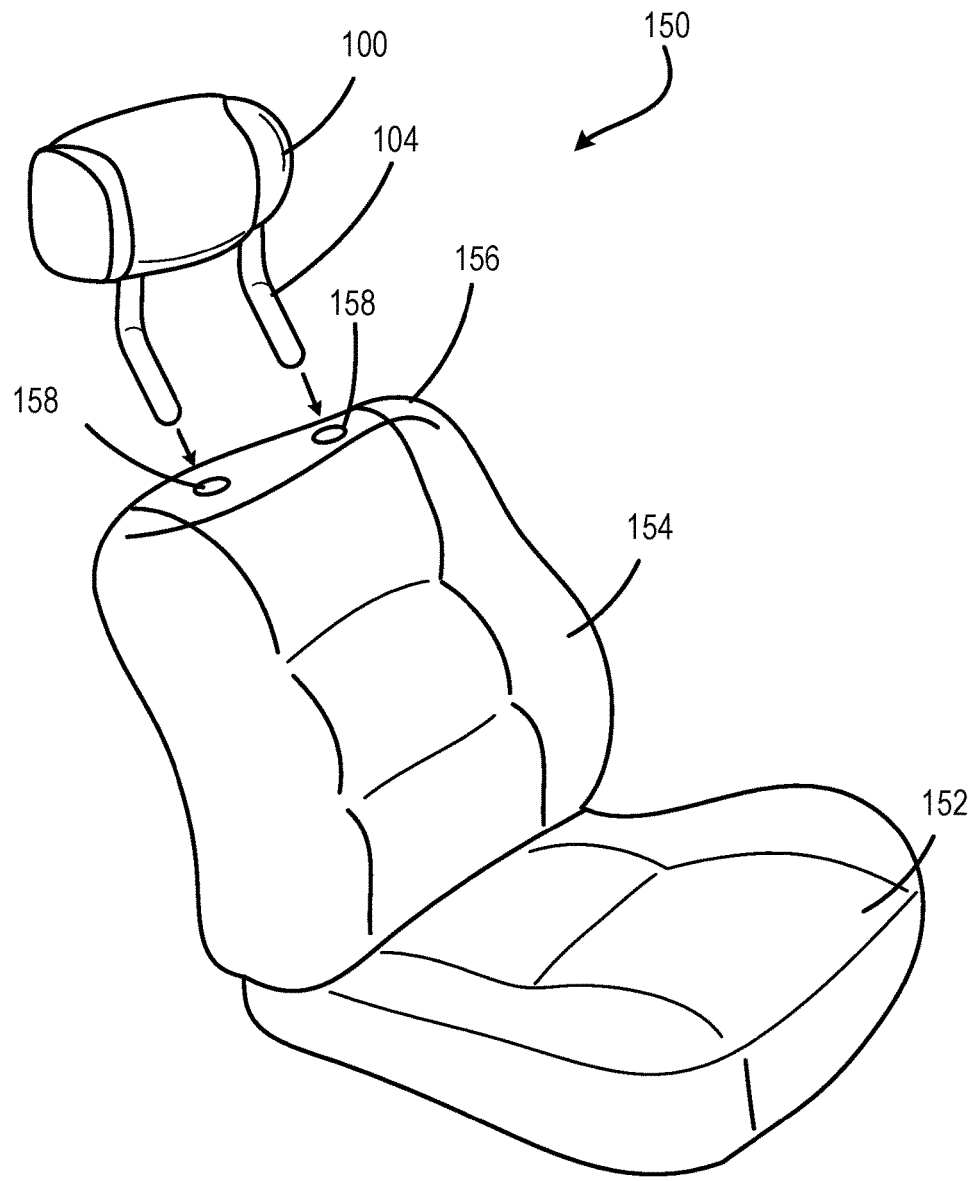
FIG. 1B is a perspective view of a vehicle seat.

The support rod 104 (which may also be referred to as a bar) can be used for mounting the headrest on a backseat of a vehicle seat. This is illustrated in FIG. 1B, which shows a vehicle seat 150 that includes a seating portion 152 and a backrest 154. A headrest (e.g., the headrest 100 shown in FIG. 1A) may be mounted on the backrest 154. In some implementations, a top surface or portion 156 of the backrest 154 includes one or more receptacles 158 for receiving a portion of the headrest, such as a support rod or bar 104. While FIG. 1B shows two receptacles 158 for receiving two corresponding support rods 104, the number of receptacles and support rods may be different in other implementations. For example, a headrest 100 may be mounted on a backrest 154 using a single support rod 104. In another example, a headrest 100 may be mounted on a backrest 154 using three or more support rods 104. In some implementations, the one or more receptacles 158 may include a sleeve (e.g., a sleeve constructed from hard plastic) that is at least partially disposed within the corresponding receptacle.

The headrest 100 may be mounted on the backrest 154 such that the headrest is movable with respect to the backrest to different positions over an adjustable range. For example, depending on the length of the one or more support rods 104, the headrest 100 may be moved up and down within the corresponding receptacles 158 to different heights in order to support the head of an occupant. Once adjusted to a suitable height for an occupant, the headrest 100 may be fixed, for example using a locking mechanism, at that particular height.

In implementations where speakers or acoustic transducers are disposed in a headrest, the wiring for the speakers may be passed through the one or more support rods 104. For example, wires from an external source (e.g., a power source and/or the source of an audio signal) may be passed though the seat backrest and into the one or more support rods 104. In some cases, the connection between the conductors in the seat backrest (or other portions of the seat) and the conductors in the support rods 104 can be established via a fixed connection point such as a plug point. In such cases conductors such as pigtail harness wiring and associated connectors can be used for providing the electrical connections to the acoustic transducers disposed in the headrest 100.

Figure 1C:
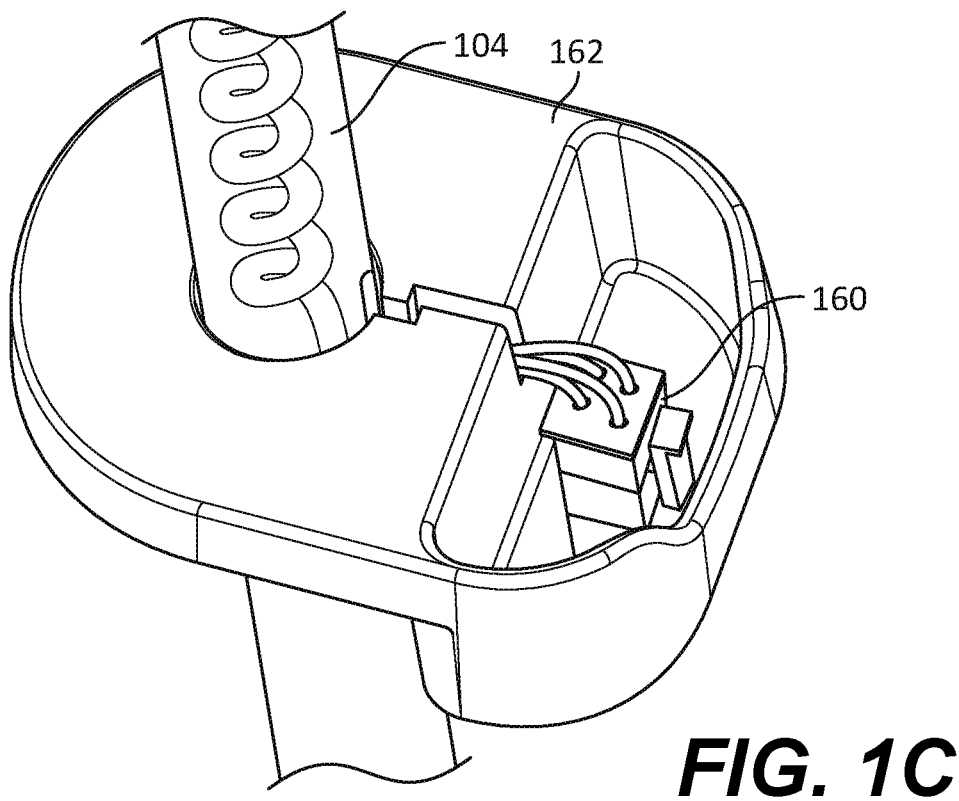
FIGS. 1C and 1D show examples of fixed point connectors for acoustic transducers disposed in headrests.
Figure 1D:
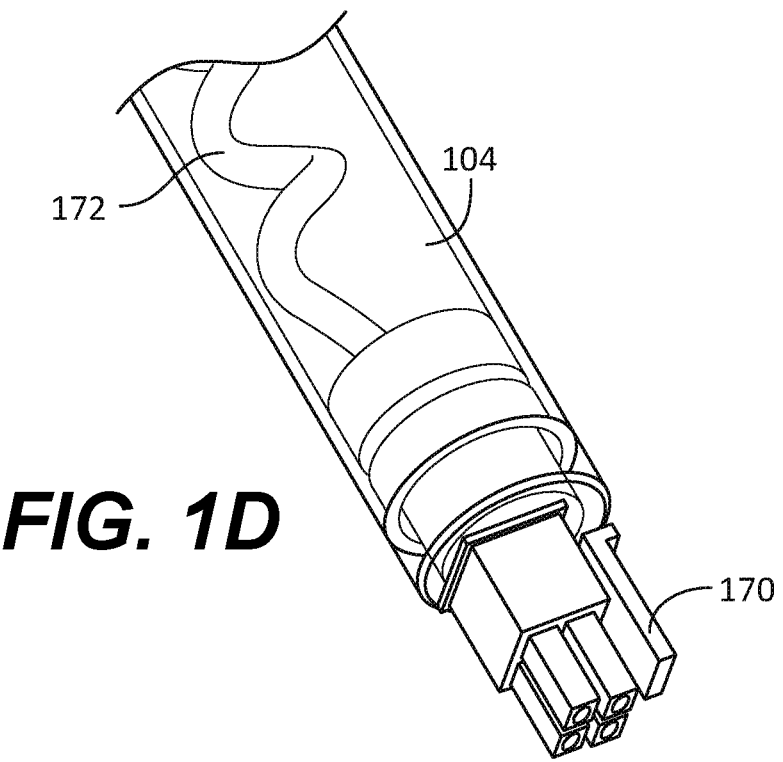

Examples of fixed point connection mechanisms for providing electrical connections to acoustic transducers disposed in headrests are shown in FIGS. 1C and 1D. In the example of FIG. 1C, a fixed connection point 160 is provided on a sleeve 162 that is disposed adjacent to the top surface 156 of the seat. The wires connected between the connection point 160 and the acoustic transducers are channeled through the hollow interior of the support rod 104. In the example of FIG. 1D, the fixed connection point 170 is disposed at one end of the support rod 104. In some cases, using such fixed point connection mechanisms in conjunction with support rods 104 for adjustable headrests may be challenging. For example, a fixed point connection may hinder a free movement of the headrest with respect to the backrest. For example, a fixed point connection may require a loose loop of pigtail harness within the backrest, which has to move as the headrest is moved up and down. Such a loop may get stuck to a portion of the inside structure of the seat, thereby potentially preventing headrest motion and/or causing stress on portions of the harness. In some cases, this may cause the insulation to wear off, or the connection to be severed from the fixed connecting point. In addition, the range of movement of the headrest with respect to the backrest may in some cases be delimited by the length of the wire that may be fitted within the support rod 104. For example, as shown in FIG. 1C, the wire 172 may be disposed within the support rod 104 in a spiral configuration such that the wire may be elongated and/or compressed in accordance with the movement of the headrest with respect to the backrest. In some cases, fitting such additional length of wire within a support rod 104 can be challenging, particularly for a support rod with small cross-sectional area of the hollow interior.

The technology described in this document provides a mechanically biased contact point or surface that maintains an electrical connection to the one or more acoustic transducers over the adjustable range of the headrest. The wires channeled through one or more support rods of the headrest are not attached to a connection point that is fixed with respect to the backrest. This in some implementations, may help avoid some of the problems of fixed point connection mechanisms described above. For example, hindrance to movement of the headrest with respect to the backrest may be reduced. Further, the adjustable range of the headrest may be increased by making such range independent of the length of wire disposed in the support rod.

FIGS. 2A and 2B illustrate portions of a mechanically biased electrical connection mechanism 200 that may be used for maintaining a connection over a range of motion of a headrest. In particular, the example of FIG. 2A shows a wire conduit 202 disposed within a support rod 104 of a headrest, the conduit 202 configured to provide electrical connection to one or more transducers disposed in the headrest. The wire conduit 202 can include one or more wires 204 for carrying operating power and/or drive signals for the one or more acoustic transducers. In such cases, the hollow interior portion of the support rod 104 forms a channel for receiving the wires 204. The one or more wires 204 terminate in an electrical contact 206 that may have one or more terminals 207 configured to receive the wires 204. The electrical contact 206 may be provided at the opening on one end of the support rod 104, such that the electrical contact is received at the opening in a locking configuration. The connection mechanism 200 also includes an electrical connector 208 that provides a connection point or surface for connecting each of the one or more wires 204 to a corresponding wire 210 coupled to an external source. For example, the electrical connector 208 can include a conducting surface 209 that is coupled to a wire 210, and provides electrical connection between the wire 210 and a corresponding wire 204 connected to the acoustic transducer. In some implementations, the conducting surface can be configured to provide such an electrical connection by being in physical touch with a terminal 207 of the electrical contact 206. In some implementations, the electrical contact 206 includes a non-conducting portion 203 (e.g., constructed from plastic or rubber) that provides an electrically insulated barrier between the electrical contact 206 and the support rod 104.

In some implementations, the connection mechanism 200 can be disposed within a sleeve 212 provided within a backrest of a seat. For example, such a sleeve 212 may be provided within a receptacle 158 of a backrest 154, as shown in FIG. 1B. FIG. 2B illustrates an example where a support rod 104 is inserted within a sleeve 212. The connector 208, which is also disposed within the sleeve 212, is mechanically biased by a spring-loaded structure 214 for keeping the connector 208 pushed against the electrical contact 206 for a range of motion of the support rod 104 within the sleeve 212. For example, as the support rod 104 is moved up and down the sleeve 212 over an adjustable range of the headrest, the spring-loaded structure 214 expands and contracts, respectively, such that a substantially constant connection is maintained between the electrical contact 206 and the connector 208. In this configuration, because the wires 204 are not attached to a fixed connection point on the seat backrest, the support rod 104 need not accommodate additional length of such wires to accommodate maintaining connection over the adjustable range of motion for the headrest. Therefore a short wire (e.g., long enough to connect the one or more acoustic transducers to the contact point 206) can be disposed within the support rod 104. In some cases, this may allow for more wires (e.g., for more transducers) to be disposed within a support rod 104. In some cases, support rods with small cross-sections, which would not be usable with a fixed-point contact mechanism, may be used for providing electrical connections to one or more acoustic transducers disposed in a headrest.

Figure 3:
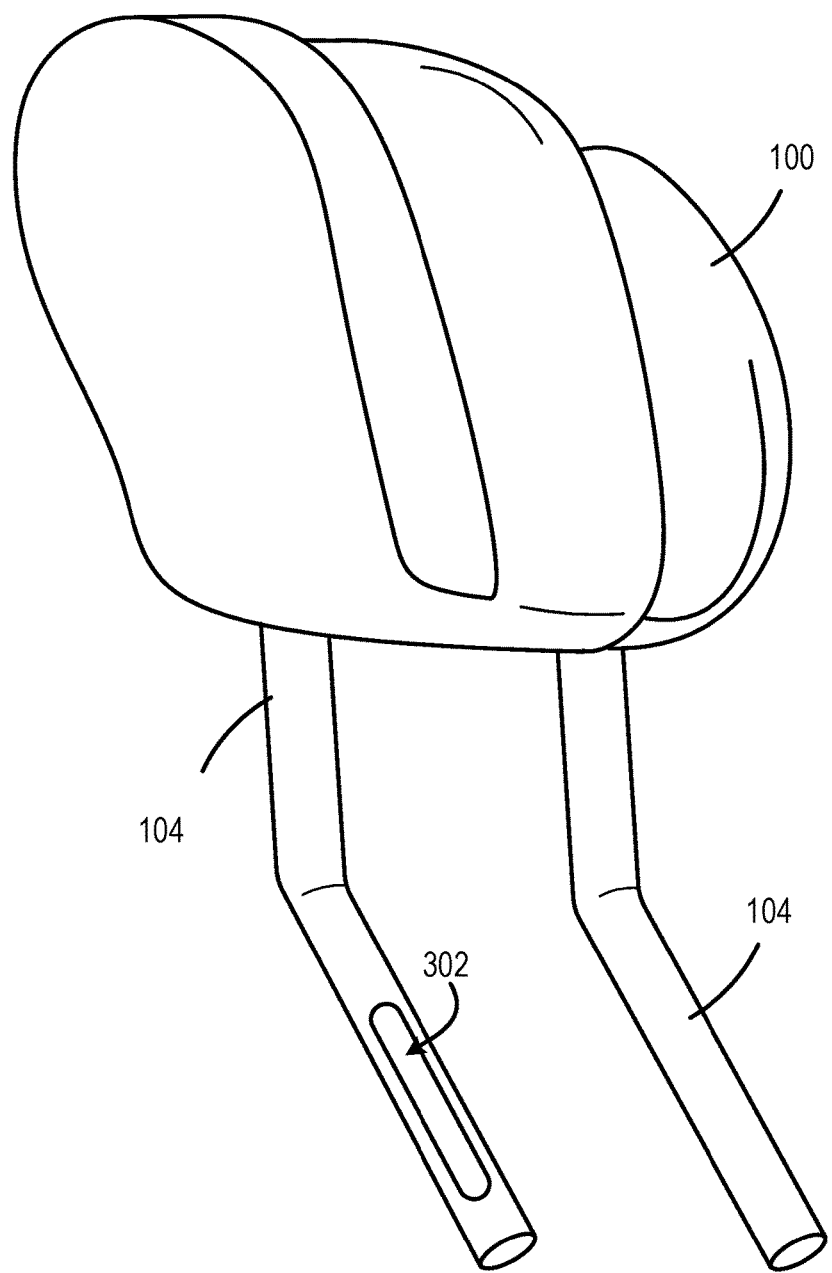
FIG. 3 shows an example of an opening in a headrest bar, the opening being usable for providing electrical connections to speakers disposed in the headrest.

In the example of FIG. 2B, the opening for providing an electrical connection between an external source and the one or more acoustic transducers is provided at one end of the support rod 104. In some implementations, such an opening may also be provided elsewhere, for example, on a sidewall of the support rod 104. FIG. 3 shows an example where an opening is provided on a sidewall of a headrest bar or support rod 104. Specifically, the example of FIG. 3 shows a slot 302, which provides the opening usable for providing electrical connections to speakers disposed in the headrest. In such cases, a mechanically biased connection may be maintained between an external source and the acoustic transducers through the slot 302 for a range of motion of the headrest 100 when mounted on a seat backrest.

Figures 4A, 4B:
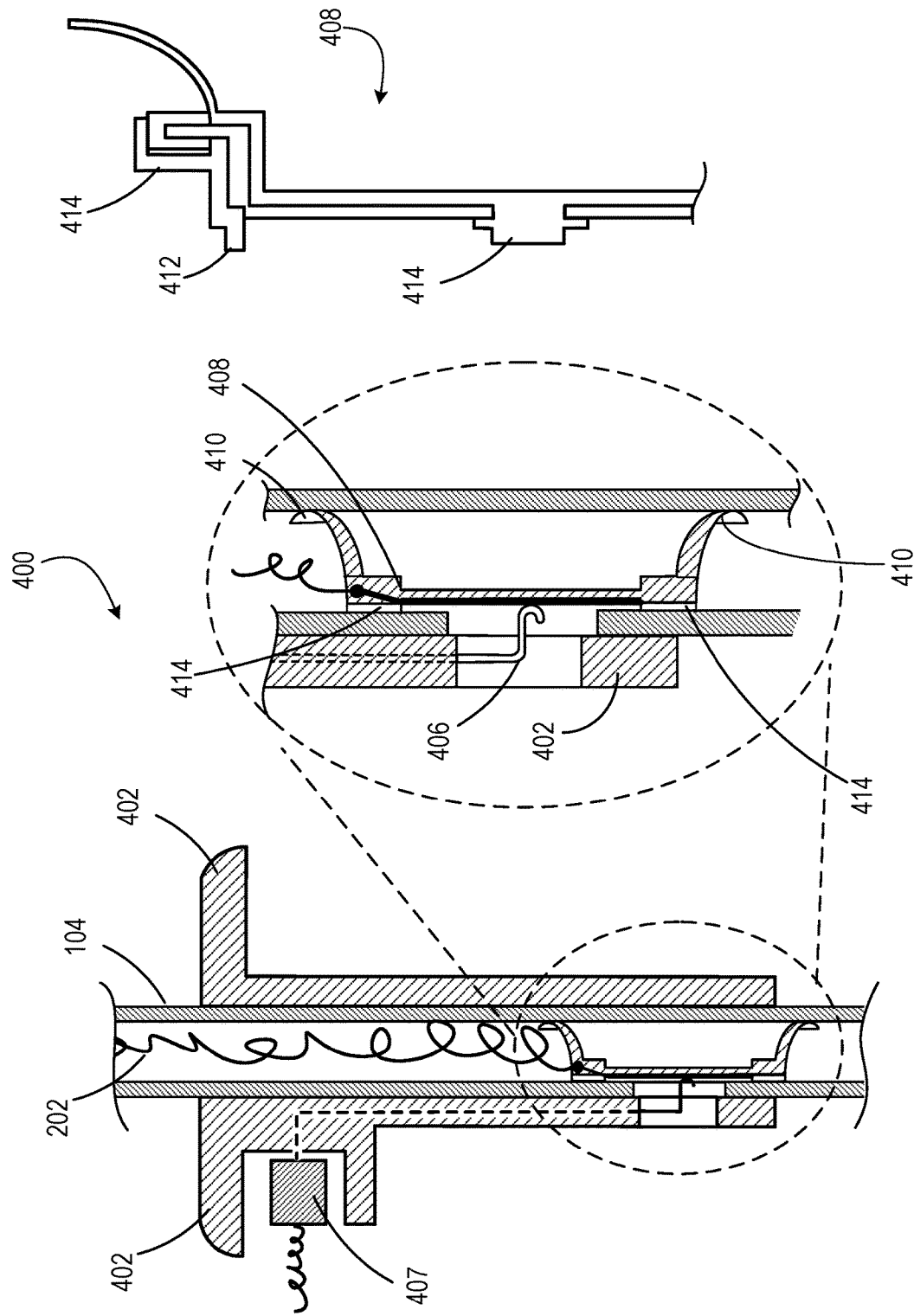
FIGS. 4A and 4B show portions of a mechanically biased electrical connection mechanism for providing a connection through the opening of FIG. 3.

FIGS. 4A and 4B show portions of a mechanically biased electrical connection mechanism for providing a connection through an opening such as the slot 302 shown in FIG. 3. In particular, FIG. 4A shows a cross-section of a support rod 104 and sleeve 402 that supports a mechanically biased electrical connection mechanism 400. The sleeve 402 may be disposed within a seat, for example, in the backrest of the seat, with the top surface of the sleeve being adjacent to the top surface 156 of the backrest. In some implementations, the mechanism 400 includes an electrical connection between an electrical connector 406 disposed within the sleeve 402 and an electrical contact 408 disposed within the support rod 104. The connector 406 is coupled to an external source (e.g., a power source and/or the source of an audio signal), a portion 407 of which may be disposed in the seat (e.g., in the sleeve 402, or other another portion of the backrest). The electrical contact 408 is electrically coupled to the one or more acoustic transducers in the headrest via one or more wires 202 disposed in the hollow interior portion of the support rod 104.

In some implementations, the electrical contact 408 is inserted into the hollow interior portion of the support rod 104 and moved to the portion adjacent to an opening on the sidewall of the support rod 104. The electrical contact 408 can be configured to have a flexible structure (e.g., one or more flexible legs 410) that imparts a mechanical bias for the electrical contact 408 to snap into position into the opening on the sidewall of the support rod 104. In some implementations, the flexible legs 410 can be constructed from a non-conducting material (e.g., hard plastic) such that the contact remains electrically isolated from the supporting rod 104. In some implementations, the electrical contact 408 includes one or more projections 412 (as shown in FIG. 4B) that enables the contact 408 to snap into the opening in a substantially locked configuration. The projections 412 may be constructed from non-conducting material (e.g., plastic or rubber) such that the contact 408 is electrically insulated from the support rod 104. In some implementations, the contact 408 can include other non-conducting portions 414 (as shown in both FIGS. 4A and 4B) for insulating the electrical contact from the supporting rod 104. Such electrical insulation may be provided to ensure that electricity flowing through the connection mechanism is not leaked into the supporting rod. This, in some cases, can reduce the chances of performance degradation resulting from the supporting rod 104 itself becoming energized.

Once the electrical contact 408 is snapped into position, the electrical contact is fixed with respect to the supporting rod 104. Accordingly, the electrical contact 408 moves up and down with the supporting rod 104 as the headrest is moved up and down, respectively. The sleeve 402 can be configured to have a corresponding opening such that the electrical connector 406 touches at least a portion of the contact 408 through the opening in the sleeve 402. As the headrest is moved up and down in an adjustable range, the contact 408 moves with respect to the connector 406. However, by ensuring that the connector 406 touches at least a portion of the contact 408, an electrical connection between the connector 406 and the contact 408 can be maintained throughout the adjustable range. This can be done, for example, by providing a mechanical bias on a portion of the electrical connection.

In some implementations, the mechanical bias can be provided on the connector 406. For example, the connector 406 can include a leaf spring that, due to the mechanical bias associated with such a spring, is kept pressed against a corresponding surface on the electrical contact 408. In some implementations, the mechanical bias can be provided on the electrical contact 408. For example, the legs 410 of the contact 408 can provide a mechanical bias for keeping the electrical contact 408 pressed against the connector 406 throughout the relative motion range of the contact 408 and the connector 406.

In some implementations, the mechanical bias can be provided both on the connector 406 and the electrical contact 408. In some implementations, portions of the connector 406 and the electrical contact 408 (e.g., the portions that touch one another) can include a plating constructed using a self-wiping material such as gold. Such a plating can be provided over another underlying conducting material such as brass or copper. In some implementations, this may reduce surface corrosion at the contact points, and potentially increase the life of the constituent parts.

While FIG. 4A shows only one connector 406, the number of connectors depend on the number of different connections with the acoustic transducers disposed in the headrest. For example, if the electrical contact 408 is configured to be connected to two wires from the one or more acoustic transducers, two separate connectors 406 are used for coupling the acoustic transducers to the external source or sources. In another example, if the electrical contact 408 is configured to be connected to four wires from the one or more acoustic transducers, four separate connectors 406 are used for coupling the acoustic transducers to the external source or sources.

FIGS. 5A-5C show examples of electrical contacts that that may be disposed in a headrest bar for providing electrical connections to acoustic transducers or speakers disposed in the headrest. Specifically, FIG. 5A shows an electrical contact 500 for connecting two wires 204 to the one or more acoustic transducers. In some implementations, the electrical contact 500 can be substantially identical to the contact 408 described above with reference to FIGS. 4A and 4B. The contact 500 can include non-conducting portions 502 that electrically insulate the contact 500 from the supporting rod in which the contact is disposed. The non-conducting portions 502 may also be used to isolate the conducting portions 504 from one another. In some implementations, the electrical contact 500 may be produced using an injection over-molding process where the non-conducting portion 502 (e.g., plastic) is over-molded around the conducting portions 504.

FIGS. 5B and 5C show an electrical contact 550 for connecting four wires to the one or more acoustic transducers. In some implementations, such an electrical contact 550 can be constructed as a two-part structure (e.g., a cover and a base) joined together along a bending portion such as a living hinge 552. FIG. 5B shows the electrical contact 550 in a closed configuration, and FIG. 5C shows the electrical contact 550 in an open configuration where the cover 554 and the base 556 are separately visible. In some implementations, the electrical contact 550 can be constructed, for example, by molding the plastic cover with one or more holes or openings 558, and connecting the plastic cover with the base 556, for example, by the living hinge 552. The conducting portions 504 can be disposed on the base 556, which is made of non-conducting material. The cover 554 can then be folded along the living hinge 552, such that the holes or openings 558 align with the conducting portions 504. In some implementations, the cover 554 can be mechanically attached over the base 556, for example, using a snap feature, heat welding, ultra-sonic welding, or adhesive.

In some implementations, each of the conducting portions can be configured to establish a separate connection with a corresponding connector via a mechanically biased configuration. The dimensions of an electrical contact such as the contacts 500 and 550 can be configured based on several constraints. For example, the shape and size of an electrical contact can be configured such that the contact fits into a corresponding opening (e.g., the slot 302 described with reference to FIG. 3) on a supporting rod. In addition, the length of the conducting portions 504 of the contacts can be configured in accordance with an adjustable range of the corresponding headrest. For example, in order for at least a portion of a connector to be in continuous touch with a conducting portion 504 throughout the adjustable range, the length of the individual conducting portions 504 may be made to be substantially equal to the adjustable range for the corresponding headrest. In some cases, the length of the individual conducting portions 504 may be slightly greater than the adjustable range for the corresponding headrest to include a guard region that ensures connections even at the extremities of the adjustable range.

A number of implementations have been described. However, other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A headrest for a vehicle seat, comprising:
   an enclosure for supporting the head of an occupant of the vehicle seat, the enclosure including one or more acoustic transducers; and
   a bar for mounting the headrest on a backrest of the seat, such that the mounted headrest is movable with respect to the backrest to different positions over an adjustable range, the bar comprising:
      one or more wires each of which is coupled to an electrical contact at one end and one of the acoustic transducers at an opposite end, the one or more wires disposed within a hollow interior portion of the bar, and
      an opening for permitting an electrical connection to be established between i) an electrical connector coupled to an external source and ii) the electrical contact coupled to the one or more wires, the connection being maintained over the adjustable range of the headrest by a mechanical bias on either the electrical connector or the electrical contact.

2. The headrest of claim 1, wherein the opening is at one end of the bar.

3. The headrest of claim 1, wherein the opening is disposed on a sidewall of the bar.

4. The headrest of claim 3, wherein the opening is configured to receive the electrical contact in a locking configuration.

5. The headrest of claim 3, wherein the opening is configured such that at least a portion of the electrical contact touches the connector through the opening over the adjustable range of the headrest.

6. The headrest of claim 3, wherein the electrical connector includes a leaf-spring that causes the connector to maintain physical touch with the electrical contact over the adjustable range of the headrest.

7. The headrest of claim 1, wherein the electrical contact comprises a non-conducting portion that provides an electrically insulated barrier between the electrical contact and the bar.

8. The headrest of claim 1, wherein the external source comprises a power source configured to provide operating power to the acoustic transducers.

9. The headrest of claim 1, wherein the external source comprises a source of an audio signal.

10. The headrest of claim 1, wherein the electrical connector comprises a spring-loaded structure disposed within the hollow interior portion, the spring-loaded structure causing the electrical connector to maintain physical touch with the electrical contact over the adjustable range of the headrest.

11. A seat comprising:
a headrest comprising an enclosure for receiving one or more acoustic transducers;
an electrical connector disposed within a portion of the seat, the electrical connector coupled to an external source associated with the one or more acoustic transducers;
an electrical contact coupled to one or more wires connected to the one or more acoustic transducers;
a backrest comprising a receptacle for receiving a portion of the headrest, such that the headrest is movable with respect to the backrest to different positions over an adjustable range, the receptacle comprising a sleeve that includes an opening for permitting a connection to be established between the electrical connector and the electrical contact; and
a bar configured to be inserted into the receptacle for mounting the headrest on the backrest, the bar comprising:
a channel for receiving the one or more wires connected to the acoustic transducers, and
a slot on a sidewall of the bar for permitting the connection to be established between the electrical connector and the electrical contact, the connection being maintained over the adjustable range of the headrest by a mechanical bias on either the electrical connector or the electrical contact.

12. The seat of claim 11, wherein the slot is configured to receive the electrical contact in a locking configuration.

13. The seat of claim 11, wherein the electrical contact comprises a non-conducting portion that provides an electrically insulated barrier between the electrical contact and the bar.

14. The seat of claim 11, wherein the slot is configured such that at least a portion of the electrical contact touches the connector through the slot over the adjustable range of the headrest.

15. The seat of claim 11, wherein the electrical connector is disposed in the receptacle.

16. The seat of claim 11, wherein the electrical connector is disposed in the bar.

17. The seat of claim 11, wherein the electrical connector includes a leaf-spring that causes the connector to maintain physical touch with the electrical contact over the adjustable range of the headrest.

18. The seat of claim 11, wherein the external source comprises a power source configured to provide operating power to the acoustic transducers.

19. The seat of claim 11, wherein the external source comprises a source of an audio signal.

20. A seat comprising:
a headrest comprising one or more acoustic transducers; and
a backrest comprising a receptacle for receiving a portion of the headrest, such that the headrest is movable with respect to the backrest to different positions over an adjustable range,
wherein the headrest further includes:
an enclosure for receiving the one or more acoustic transducers, and
a bar configured to be inserted into the receptacle for mounting the headrest on the backrest, the bar comprising:
a hollow interior portion forming a channel for receiving one or more wires connected to the acoustic transducers, and
a spring-loaded structure disposed within the hollow interior portion, the spring-loaded structure causing an electrical connector to maintain electrical contact with the one or more wires over the adjustable range of the headrest.

21. The seat of claim 20, wherein the electrical connector is coupled to an external source of power.

22. The seat of claim 20, wherein the electrical connector is coupled to a source of an audio signal for the one or more acoustic transducers.

23. The seat of claim 20, wherein an upper portion of the bar is coupled to the enclosure, and the spring loaded structure is disposed in an opposite, lower portion of the bar.

24. The seat of claim 20, wherein the electrical contact comprises a non-conducting portion that provides an electrically insulated barrier between the electrical contact and the bar.

* * * * *